United States Patent
Mimura

[11] Patent Number: 6,056,660
[45] Date of Patent: May 2, 2000

[54] DIFFERENTIAL GEAR

[76] Inventor: Kenji Mimura, 29-1105, Wakabadai 4-chome, Asahi-ku, Yokohama-shi, Kanagawa 241, Japan

[21] Appl. No.: 08/975,001

[22] Filed: Nov. 20, 1997

[30] Foreign Application Priority Data

Nov. 22, 1996 [JP] Japan ................................. 8-312411

[51] Int. Cl.⁷ .................................................. F16H 37/08
[52] U.S. Cl. ........................................ 475/205; 475/278
[58] Field of Search ..................... 475/29, 30, 204, 475/205, 221, 223, 225, 231, 278; 74/665 F, 665 GC

[56] References Cited

U.S. PATENT DOCUMENTS

| | | | |
|---|---|---|---|
| 3,733,928 | 5/1973 | Uozumi et al. | 475/278 |
| 3,859,871 | 1/1975 | Uozumi et al. | 475/278 X |
| 3,863,524 | 2/1975 | Mori et al. | 475/278 X |
| 4,357,840 | 11/1982 | Winzeler | 475/205 |
| 4,546,672 | 10/1985 | Leboime | 475/279 |
| 5,049,116 | 9/1991 | Asada | 475/278 X |
| 5,087,232 | 2/1992 | Asada | 475/278 |
| 5,525,117 | 6/1996 | Morisawa et al. | 475/205 X |
| 5,692,987 | 12/1997 | Shibahata et al. | 475/204 |

*Primary Examiner*—Rodney H. Bonck
*Assistant Examiner*—Scott Lund
*Attorney, Agent, or Firm*—Lowe Hauptman Gopstein Gilman & Berner

[57] ABSTRACT

The present invention aims at realizing with a simple structure a differential gear capable of arbitrarily producing a difference in speed of rotation between output side rotary members. When a difference in speed of rotation occurs between drive shafts 3 and 4, if clutches 12 and 17 are disconnected, a first input side sun gear 8 and a first output side sun gear 9 are allowed to rotate at arbitrary speed ratios independently of each other due to the rotation and the revolution of first planetary gears 10, besides a second input side sun gear 13 and a second output side sun gear 14 are allowed to rotate at arbitrary speed ratios independently of each other due to the rotation and the revolution of second planetary gears 15. When the first clutch 12 for example is brought into connection, the revolution of the first planetary gears 10 is controlled. Thus, by setting appropriately the gear ratio between the sun gears 8, 9 and gears 10*a*, 10*b* of the first planetary gear 10, the drive shaft 3 on one hand is allowed to rotate faster than the drive shaft 4 on the other.

4 Claims, 4 Drawing Sheets

DIFFERENTIAL GEAR

BACKGROUND OF THE INVENTION

1. Field of the Invention

The present invention relates to a differential gear for permitting a difference in speed of rotation between right and left driving wheels of a motor vehicle for instance.

2. Description of the Related Art

A differential gear for the motor vehicle is a unit for permitting a difference in speed of rotation between right and left driving wheels which may occur when the motor vehicle is moving in a curve, or a difference in speed of rotation between front and rear driving wheels of a motor vehicle with four-wheel drive. A typical arrangement of the differential gear is such that a pinion gear intervenes between a pair of bevel gears coupled to output shafts, and that when an external rotational force is applied to the pinion gear shaft, the pinion gear rotates on its own axis at the time of occurrence of a differential motion so as to permit a difference in speed of rotation between the output shafts.

By the way, when the motor vehicle turns along a curve, a difference in speed of rotation occurs between the inner wheel and the outer wheel is permitted by the above-described differential gear, the difference in speed of rotation being caused attendantly as a result of a frictional force between the wheels and the surface of a road. It is thus possible to enhance the turning performance or the high-speed stability by positively generating the difference in speed of rotation between the driving wheels. If, for instance, the left-hand wheel is rotated faster than the ordinary rotational speed upon a rightward turning, then the handling operation for turning will be facilitated. Also, when the motor vehicle is subjected to a strong lateral wind upon a straight movement, if the wheel on the downwind side is rotated faster than the wheel on the opposite side, the automobile can be prevented from being transversely urged without any extreme handling operation. Accordingly, the realization of such a unit with a simple structure would be very effective in enhancing the performance of the motor vehicles.

SUMMARY OF THE INVENTION

The present invention was conceived in view of the above problems. It is therefore an object of the present invention to realize with a simple structure a differential gear capable of arbitrarily generating a difference in speed of rotation between output side rotary members.

In order to achieve the above object, according to a first aspect of the present invention, there is provided a differential gear having an input side rotary member for receiving an external driving force, a pair of output side rotary members arranged coaxially with the rotational axis the input side rotary member, and a gear body for free-rotatably supporting the input side rotary member and the output side rotary members, with a rotational force of the input side rotary member being transmitted to the output side rotary members while permitting a difference in speed of rotation between the output side rotary members, the differential gear further comprising a first input side gear disposed on the input side rotary member at its one end side in the axial direction and rotating jointly with the input side rotary member; a second input side gear disposed on the input side rotary member at its other end side in the axial direction and rotating jointly with the input side rotary member; a first output side gear having a deceleration ratio larger or smaller relative to the first input side gear and rotating jointly with one of the output side rotary members; a second output side gear having a deceleration ratio larger or smaller relative to the second input side gear and rotating jointly with the other output side rotary member; at least one first planetary gear meshing with the first input side gear and the first output side gear; at least one second planetary gear meshing with the second input side gear and the second output side gear; a first support member for supporting the first planetary gear to be able to rotate on its own axis and to revolve around the rotational axis of the input side rotary member; a second support member for supporting the second planetary gear to be able to rotate on its own axis and to revolve around the rotational axis of the input side rotary member; first rotation controlling means for controlling with an arbitrary controlling force the rotation of the first support member around the rotational axis of the input side rotary member; and second rotation controlling means for controlling with an arbitrary controlling force the rotation of the second support member around the rotational axis of the input side rotary member.

Thus, when a difference in speed of rotation occurs between the output side rotary members, if the rotation controlling means are released, then the first input side gear rotating jointly with the input side rotary member and the first output side gear rotating jointly with one of the output side rotary members are allowed to rotate at arbitrary speed ratios independently of each other due to the rotation and the revolution of the first planetary gears, besides the second input side gear rotating jointly with the input side rotary member and the second output side gear rotating jointly with the other output side rotary member are allowed to rotate at arbitrary speed ratios independently of each other due to the rotation and the revolution of the second planetary gears. When the rotation of the first support member is controlled by the first rotation controlling means, the revolution of the first planetary gear is controlled, with the result that by setting appropriately the gear ratios between the first input side gear, the first output side gear and the first planetary gears, one of the output side rotary members for instance can be controlled to rotate faster than the other output side rotary member. On the contrary, when the rotation of the second support member is controlled by the second rotation controlling means, the revolution of the second planetary gears is controlled, with the result that by setting appropriately the gear ratios between the second input side gear, the second output side gear and the second planetary gears, the other output side rotary member for instance can be controlled to rotate faster than the one of the output side rotary members.

In order to achieve the above object, according to a second aspect of the present invention, there is provided a differential gear having an input side rotary member for receiving an external driving force, a pair of output side rotary members arranged coaxially with the rotational axis of the input side rotary member, and a gear body for free-rotatably supporting the input side rotary member and the output side rotary members, with a rotational force of the input side rotary member being transmitted to the output side rotary members while permitting a difference in speed of rotation between the output side rotary members, the differential gear further comprising a first input side gear disposed on the input side rotary member at its one end side in the axial direction and rotating jointly with the input side rotary member; a second input side gear disposed on the input side rotary member at its one end side in the axial direction and rotating jointly with the input side rotary member; a first output side gear having a deceleration ratio larger or smaller relative to the first input side gear and rotating jointly with one of the output side rotary members; a second output side gear having a deceleration ratio larger or smaller relative to the second input side gear and rotating coaxially with one of the output side rotary member; at least one first planetary gear meshing with the first input side gear and the first output side gear; at least one second planetary gear meshing with the second input side gear and the second output side gear; a support member for supporting the first planetary gear and the second planetary gear to be able to rotate coaxially on their own axes and to revolve around the rotational axis of the input side rotary member; first rotation controlling means for controlling with an arbitrary controlling force the rotation of the support member around the rotational axis of the input side rotary member; and second rotation controlling means for controlling with an arbitrary controlling force the rotation of the second output side gear.

Thus, when a difference in speed of rotation takes place between the output side rotary members, if the rotation controlling means are released, then the first input side gear rotating jointly with the input side rotary member and the first output side gear rotating jointly with one of the output side rotary members are allowed to rotate at arbitrary speed ratios independently of each other due to the rotation and the revolution of the first planetary gears, besides the second input side gear rotating jointly with the input side rotary member and the second output side gear rotating coaxially with one of the output side rotary members are allowed to rotate at arbitrary speed ratios independently of each other due to the rotation and the revolution of the second planetary gears. When the rotation of the first support member is controlled by the first rotation controlling means, the rotation of the first planetary gear is controlled, with the result that by setting appropriately the gear ratios between the first input side gear, the first output side gear and the first planetary gears, one of the output side rotary members for instance can be controlled to rotate faster than the other output side rotary member. On the contrary, when the rotation of the second support member is controlled by the second rotation controlling means, the rotation of the second output side gear is controlled, with the result that by setting appropriately the gear ratios between the second input side gear, the second output side gear and the second planetary gears, the other output side rotary member for instance can be controlled to rotate faster than the one of the output side rotary members.

Thus, according to the present invention, there can be realized with the simple structure the differential gear capable of arbitrarily generating a difference in speed of rotation between the output side rotary members, whereby the turning performance can be enhanced by rotating the outside driving wheel faster than the inside driving wheel in a curve when a motor vehicle turns for instance, which will remarkably contribute to an improvement in performance of the motor vehicle.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENTS

Figure 1:
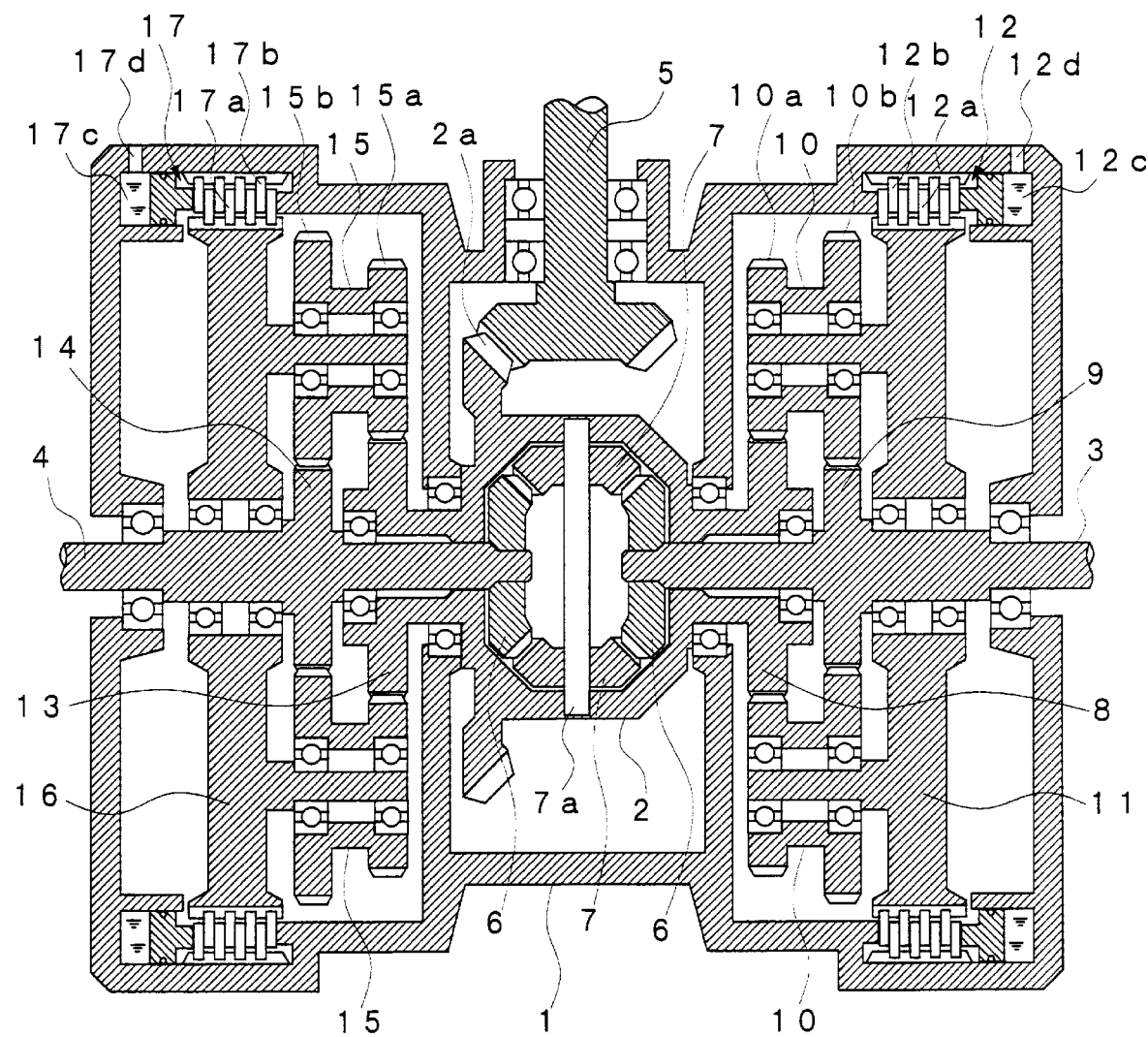
FIG. 1 is a sectional side elevation of a first embodiment of a differential gear in accordance with the present invention.
Figure 2:
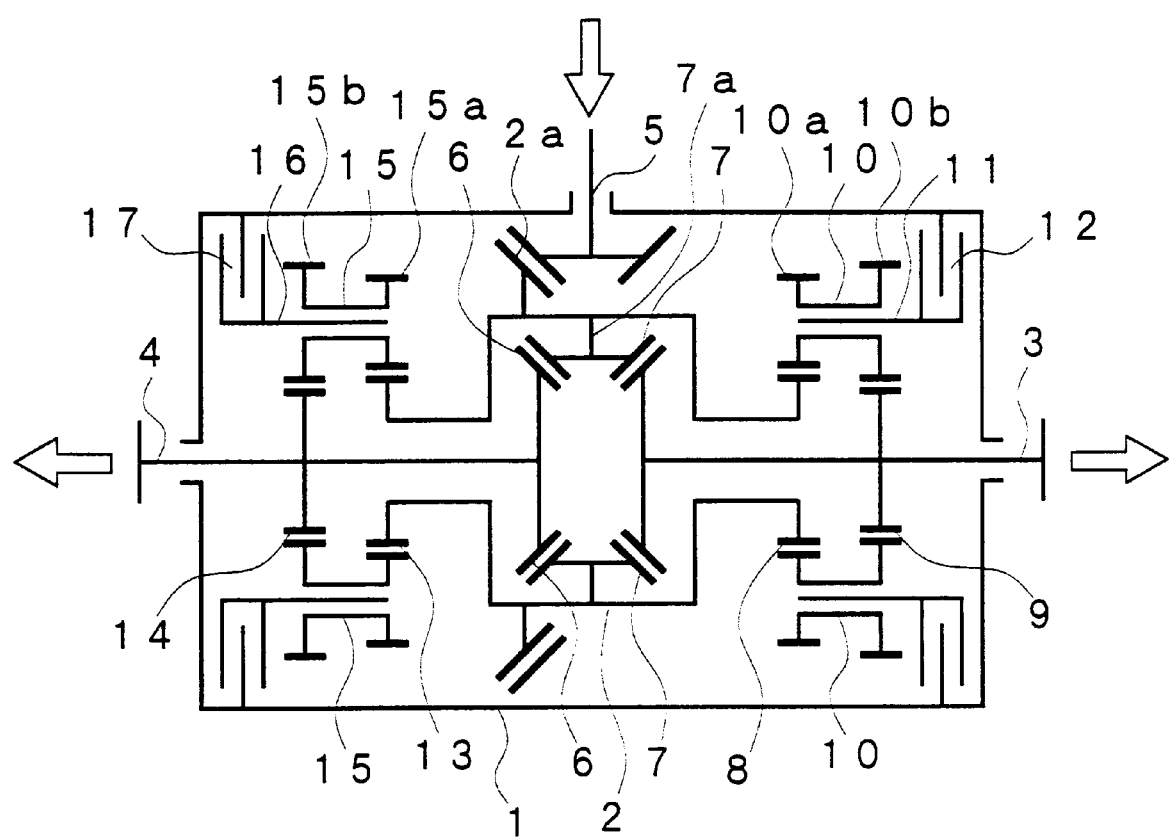
FIG. 2 is a schematic view of the differential gear shown in FIG. 1.

FIG. 1 illustrates a first embodiment of a differential gear in accordance with the present invention, the differential gear being interposed between right and left driving wheels of a motor vehicle.

The differential gear of this embodiment comprises a gear body 1 fixedly secured to a vehicle body, a gear case 2 receiving a driving force from a vehicle engine, and a of drive shafts 3 and 4 arranged coaxially with a rotational axis of the gear case 2. A rotational force of the gear case 2 is transmitted to the drive shafts 3 and 4 while permitting a difference in speed of rotation between the drive shafts 3 and 4. In this case, the drive shaft 3 on one hand is coupled to the right-hand driving wheel R of the vehicle, and the drive shaft 4 on the other is coupled to the left-hand driving wheel L of the vehicle.

More specifically, the gear case 2 includes a ring gear 2a which in rotation engages with a propeller shaft 5 rotated by a driving force from the engine. The drive shafts 3 and 4 have at their respective one ends their respective bevel gears 6 which are engaged with each other by way of a plurality of pinion gears 7. In this case, each pinion gear 7 is supported by a pinion shaft 7a fixedly secured to the gear case 2 and rotates jointly with the gear case 2.

On one end side of the gear case 2 there are provided a first input side sun gear 8 rotating jointly with the gear case 2, a first output side sun gear 9 rotating jointly with the drive shaft 3 on one hand, a plurality of first planetary gears 10 engaging with the sun gears 8 and 9, a first carrier 11 rotationally supporting the first planetary gears 10 on their own axes, and a first clutch 12 for controlling the rotation of the first carrier 11 with an arbitrary controlling force. The first input side sun gear 8 and the first output side sun gear 9 are so formed as to be different in size from each other, with each of the first planetary gears 10 axially integrally including gears 10a and 10b engaging with the sun gears 8 and 9. The first carrier 11 is so provided rotatably around a rotational axis of the drive shaft 3 and supports the first planetary gears 10 rotatably around the rotational axis of the drive shaft 3. The first clutch 12 is interposed between the first carrier 11 and the gear body 1 and includes a plurality of friction plates 12a supported on the first carrier 11 side and a plurality of friction plates 12b supported on the gear body 1 side. The friction plates 12a and 12b are arranged alternately with one another and brought into pressure bonded to each other with an arbitrary pressing force by a hydraulic cylinder 12c to thereby control the rotation of the first carrier 11. In this case, the hydraulic cylinder 12c is connected via an oil communication port 12d to a hydraulic driving circuit not shown.

On the other end side of the gear case 2 there are provided a second input side sun gear 13 rotating jointly with the gear case 2, a second output side sun gear 14 rotating jointly with the drive shaft 4 on the other, a plurality of second planetary gears 15 engaging with the sun gears 13 and 14, a second carrier 16 rotatably supporting the second planetary gears 15 on their own axes, and a second clutch 17 for controlling the rotation of the second carrier 16 with an arbitrary controlling force. The second input side sun gear 13 and the second output side sun gear 14 are so formed as to be different in size from one another, with each of the second planetary gears 15 axially integrally including gears 15a and 15b engaging with the sun gears 13 and 14. The second carrier 16 is provided rotatably around the rotational axis of the drive shaft 4, and supports the second planetary gears 15 rotatably around the rotational axis of the drive shaft 4. Similar to the first clutch 12, the second clutch 17 is interposed between the second carrier 16 and the gear body 1, and includes a plurality of friction plates 17a supported on the second carrier 16 side and a plurality of friction plates 17b supported on the gear body 1 side. The friction plates 17a and 17b are arranged alternately with one another and pressure bonded to each other with an arbitrary pressing force by a hydraulic cylinder 17c to thereby control the rotation of the second carrier 16. In this case, the hydraulic cylinder 17c is connected via an oil communication port 17d to a hydraulic driving circuit not shown.

In the above configuration, when the gear case 2 receives an driving force from the engine by way of the propeller shaft 5, the gear case 2 rotates coaxially with the drive shafts 3 and 4, and a rotational force of the gear case 2 is transmitted via the pinion gears 7 and the bevel gears 6 to the drive shafts 3 and 4. At that time, if a difference in speed of rotation occurs between the drive shafts 3 and 4 for example when a motor vehicle runs along a curve, then the pinion gears 7 rotate on their own axes to permit the difference in speed of rotation between the drive shafts 3 and 4. In this case, if the clutches 12 and 17 are disengaged, then the first input side sun gear 8 rotating jointly with the gear case 2 and the first output side sun gear 9 rotating jointly with the drive shaft 3 on one hand are allowed to rotate at arbitrary speed ratios independently of each other due to the rotation and revolution of the first planetary gears 10, besides the second input side sun gear 13 rotating jointly with the gear case 2 and the second output side sun gear 14 rotating jointly with the drive shaft 4 on the other are allowed to rotate at arbitrary speed ratios independently of each other due to the rotation and revolution of the second planetary gears 15.

When the first clutch 12 is brought into engagement herein, the rotation of the first carrier 11, that is, the revolution of the first planetary gears 10 is controlled, with the result that when the first carrier 11 is entirely fixed, the drive shafts 3 and 4 are so controlled as to rotate at mutually arbitrary speed ratios on the basis of the gear ratios between the sun gears 8, 9 and the gears 10a, 10b of the first planetary gear 10. Let the number of teeth of the first input side sun gear 8 be Za, the number of teeth of the gears 10a and 10b be Zb and Zc, respectively, and the number of teeth of the first output side sun gear 9 be Zd. Then, per rotation of the gear case 2, the first planetary gears 10 rotate on their own axes by $$-Za/Zb \quad (1)$$

Therefore, the right-hand drive shaft 3 rotates by $$(Za/Zb)(Zc/Zd) \quad (2)$$

and the left-hand drive shaft 4 rotates by $$2-(Za/Zb)(Zc/Zd) \quad (3)$$

Hence the speed ratio between the right-hand drive shaft 3 and the left-hand drive shaft 4 results in $$(Za/Zb)(Zc/Zd):2-(Za/Zb)(Zc/Zd) \quad (4)$$

In this case Za>Zd, and Zb<Zc. Hence, by setting Za, Zb, Zc and Zd so as to become $$(Za/Zb)(Zc/Zd)>1 \quad (5)$$

the right-hand drive shaft 3 is allowed to rotate faster than the left-hand drive shaft 4.

Since the other end side of the gear case 2 is symmetric with the one end side thereof, the disconnection of the first clutch 12 and the connection of the second clutch 17 will allow the left-hand drive shaft 4 to rotate faster than the right-hand drive shaft 3 on the basis of the same principle as the above.

Also, by controlling the rotation of the carriers 11 and 16 by an arbitrary controlling force with the first clutch 12 and the second clutch 17 being in half-connection, the the drive shafts 3 and 4 can rotate at an arbitrary speed ratio which is smaller than the case where the carriers 11 and 16 are fixed.

Accordingly, it becomes possible to enhance the turning performance by sensing the speed of the motor vehicle, the steering angle, the forward/backward and rightward/leftward accelerations, etc., by means of a sensor not shown and by, on the basis of the information, connecting the first clutch 12 when the motor vehicle turns to left for example, to allow the right-hand driving wheel to rotate faster than the case of an ordinary difference in speed of rotation relative to the left-hand driving wheel.

Figure 3:
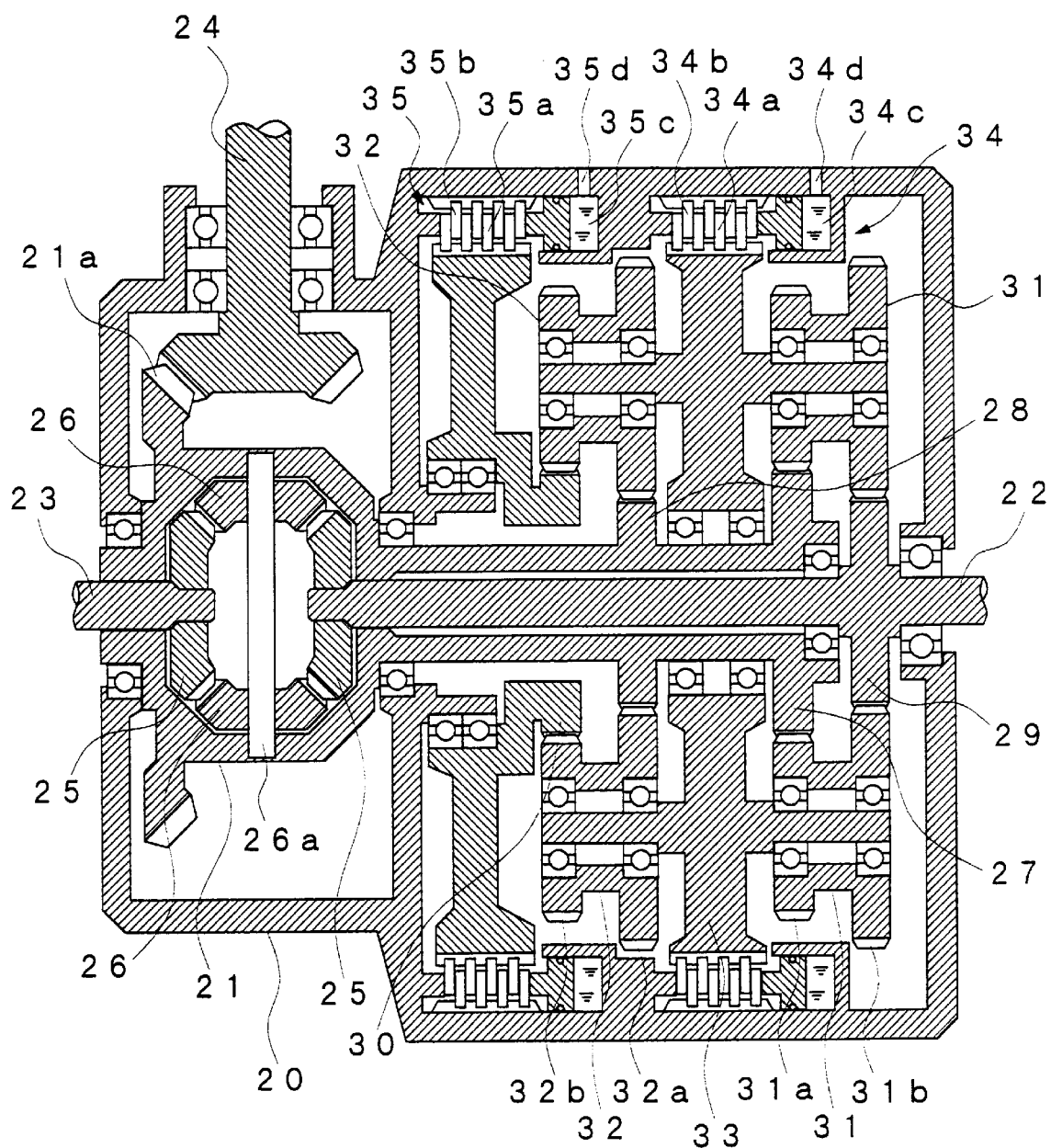
FIG. 3 is a sectional side elevation of a second embodiment of a differential gear in accordance with the present invention.
Figure 4:
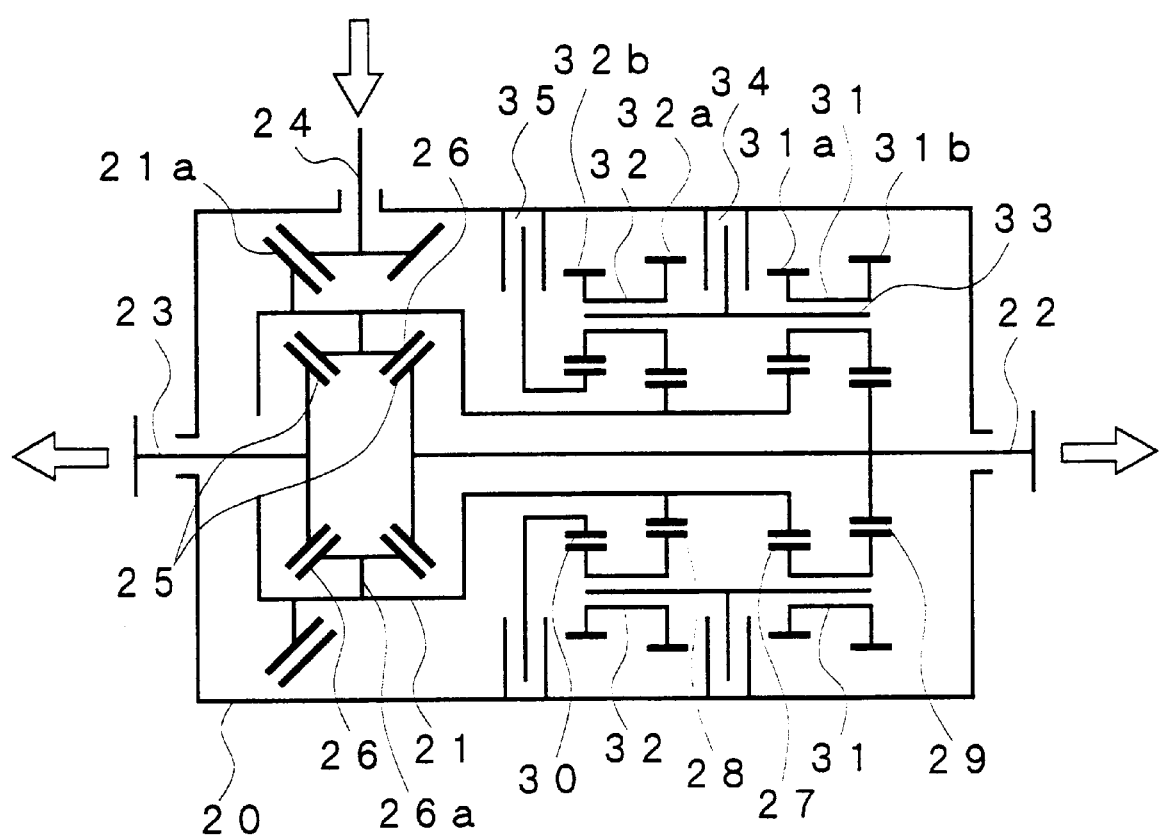
FIG. 4 is a schematic view of the differential gear shown in FIG. 3.

FIG. 3 illustrates a second embodiment of a differential gear in accordance with the present invention, the differential gear being interposed between the right and left driving wheels of a motor vehicle in the same manner as the first embodiment.

The differential gear of this embodiment comprises a gear body 20 fixedly secured to the vehicle body, a gear case 21 receiving a driving force from the vehicle engine, and a pair of drive shafts 22 and 23 arranged coaxially with the rotational axis of the gear case 21. A rotational force of the gear case 21 is transmitted to the drive shafts 22 and 23 while permitting a difference in speed of rotation of the drive shafts 22 and 23. In this case, the drive shaft 22 on one hand is coupled to the right-hand driving wheel R of the motor vehicle, and the drive shaft 23 on the other is coupled to the left-hand driving wheel L of the motor vehicle.

More specifically, the gear case 21 includes a ring gear 21a which is engaged with a propeller shaft 24 rotated by a driving force from the engine. The drive shafts 22 and 23 include at their one ends respective bevel gears 25 which are meshed with each other by way of a plurality of pinion gears 26. In this case, the pinion gears 26 are supported by a pinion shafts 26a fixedly secured to the gear case 21 and rotate jointly with the gear case 21.

On one end side of the gear case 21, there are provided a first input side sun gear 27 rotating jointly with the gear case 21, a second input side sun gear 28 also rotating jointly with the gear case 21, a first output side sun gear 29 rotating jointly with the drive shaft 22 on one hand, a second output side sun gear 30 rotating coaxially with the drive shaft 22 on one hand, a plurality of first planetary gears 31 meshing with the first input side sun gear 27 and the first output side sun gear 29, a plurality of second planetary gears 32 meshing with the second input side sun gear 28 and the second output side sun gear 30, a carrier 33 for rotatably supporting the first and second planetary gears 31 and 32 on their own axes, a first clutch 34 for controlling the rotation of the carrier 33 with an arbitrary controlling force, and a second clutch 35 for controlling the rotation of the second output sun gear 30 with an arbitrary controlling force. The first input side sun gear 27 and the first output side sun gear 29 are so formed as to be different in size from each other, and each of the first planetary gears 31 axially integrally includes gears 31a and 31b meshing with the sun gears 27 and 29. The second input side sun gear 28 and the second output side sun gear 30 are so formed as to be different in size from each other and each of the second planetary gears 32 axially integrally includes gears 32a and 32b meshing with the sun gears 28 and 30. The carrier 33 is provided rotatably around the rotational axis of the drive shaft 22 on one hand, and supports the first planetary gears 31 rotatably around the rotational axis of the drive shaft 22 on one hand. The first clutch 34 is interposed between the carrier 33 and the gear body 20, and includes a plurality of friction plates 34a supported on the carrier 33 side and a plurality of friction plates 34b supported on the gear body 20 side. The friction plates 34a and 34b are alternately arranged and pressure bonded to each other with an arbitrary pressing force by a hydraulic cylinder 34c, to thereby control the rotation of the carrier 33. In this instance, the hydraulic cylinder 34c is connected via an oil communication port 34d to a hydraulic driving circuit not shown. On the contrary, the second clutch 35 is interposed between the second output side sun gear 30 and the gear body 20, and includes a plurality of friction plates 35a supported on the output side sun gear 30 side and a plurality of friction plates 35b supported on the gear body 20 side. The friction plates 35a and 35b are alternately arranged and pressure bonded to each other with an arbitrary pressing force by a hydraulic cylinder 35c, to thereby control the rotation of the output side sun gear 30. In this instance, the hydraulic cylinder 35c is connected via an oil communication port 35d to a hydraulic driving circuit not shown, in the same manner as the first clutch 34.

In the above configuration, when the gear case 21 receives a driving force from the engine by way of the propeller shaft 24, the gear case 21 rotates coaxially with the drive shafts 22 and 23 in the same manner as the first embodiment, and a rotational force of the gear case 21 is transmitted to the drive shafts 22 and 23 by way of the pinion gears 26 and the bevel gears 25. At that time, if a difference in speed of rotation occurs between the drive shafts 22 and 23 for example when the motor vehicle runs along a curve, then the pinion gears 26 rotates on their own axes to permit the difference in speed of rotation between the drive shafts 22 and 23. In this instance, if the clutches 34 and 35 are disconnected, the first input side sun gear 27 rotating jointly with the gear case 21 and the first output side sun gear 29 rotating jointly with the drive shaft 22 on one hand are allowed to rotate at arbitrary speed ratios independently of each other due to the rotation and the revolution of the first planetary gears 31, besides the second input side sun gear 28 rotating jointly with the gear case 21 and the second output side sun gear 30 rotating coaxially with the drive shaft 23 are allowed to rotate at arbitrary speed ratios independently of each other due to the rotation and the revolution of the second planetary gears 32.

When the first clutch 34 is brought into a connection herein, the rotation of the carrier 33, that is, the revolution of the first planetary gears 31 is controlled, with the result that when the carrier 33 for instance is entirely fixed, the drive shafts 22 and 23 are so controlled as to rotate at arbitrary speed ratios independently of each other on the basis of the gear ratios between the first input side sun gear 27, the first output side sun gear 29 and the gears 31a, 31b of thefirstplanetarygear31. Let the number of teeth of the first input side sun gear 27 be Za, the number of teeth of the gears 31a and 31b be Zb and Zc, respectively, and the number of teeth of the first output side sun gear 29 be Zd. Then, per rotation of the gear case 21, the first planetary gears 31 are allowed to rotate on their own axes by $$-Za/Zb \qquad (6)$$

Therefore, the right-hand drive shaft 22 rotates by $$(Za/Zb)(Zc/Zd) \qquad (7)$$

and the left-hand drive shaft 23 rotates by $$2-(Za/Zb)(Zc/Zd) \qquad (8)$$

Hence the speed ratio between the right-hand drive shaft 22 and the left-hand drive shaft 23 results in $$(Za/Zb)(Zc/Zd):2-(Za/Zb)(Zc/Zd) \qquad (9)$$

In this instance, Za>Zd, and Zb<Zc. Hence, by setting Za, Zb, Zc and Zd so as to become $$(Za/Zb)(Zc/Zd)>1 \qquad (10)$$

the right-hand drive shaft 22 is allowed to rotate faster than the left-hand drive shaft 23.

Also, the disconnection of the first clutch 34 and the connection of the second clutch 35 will result in a control of the rotation of the second output side sun gear 30, so that when the second output side sun gear 30 for instance is entirely fixed, the carrier 33 and the gear case 21 are so controlled as to rotate at mutually arbitrary speed ratios on the basis of the gear ratios between the second input side sun gear 28, the second output side sun gear 30 and the gears 32a and 32b of the second planetary gear 32. Let the number of teeth of the second output side sun gear 30 be Ze, the number of teeth of the gears 32a and 32b be Zg and Zf, respectively, and the number of teeth of the second input side sun gear 28 be Zh. Then, per rotation of the carrier 33, the second planetary gear 32 rotates on its own axis by $$Ze/Zf \qquad (11)$$

That is, the rotation of the second planetary gear 32 on its own axis given as $$-(Ze/Zf)(Zg/Zh) \qquad (12)$$

is added to one revolution of the second planetary gear 32, with the result that for each rotation of the carrier 33 the gear case 21 is allowed to rotate by $$1-(Ze/Zf)(Zg/Zh) \qquad (13)$$

Furthermore, the first input side sun gear 27 rotates jointly with the gear case 21 and then the first planetary gear 31 also rotates, so that the rotation of the first planetary gear 32 on its own axis expressed as $$-[1-\{1-(Ze/Zf)(Zg/Zh)\}]\times(Za/Zb)(Zc/Zd) \qquad (14)$$

is added to one revolution of the first planetary gear 31, allowing the right-hand drive shaft 22 to rotate by $$1-[1-\{1-(Ze/Zf)(Zg/Zh)\}]\times(Za/Zb)(Zc/Zd) \qquad (15)$$

Accordingly, the speed ratio between the gear case 21 and the right-hand drive shaft 22 results in $$1-(Ze/Zf)(Zg/Zh):1-[1-\{1-(Ze/Zf)(Zg/Zh)\}]\times(Za/Zb)(Zc/Zd) \qquad (16)$$

Thus, by setting Ze, Zf, Zg and Zh so that the speed ratio between the right-hand drive shaft 22 and the left-hand drive shaft 23 becomes reverse to the case of connection of the first clutch 34, that is, becomes $$2-(Za/Zb)(Za/Zb):(Za/Zb)(Za/Zb) \qquad (17)$$

the left-hand drive shaft 23 is allowed to rotate faster than the right-hand drive shaft 22.

While the invention has been described in connection with preferred embodiments, it is not intended to limit the scope of the invention to the particular forms set forth, but on the contrary, it is intended to cove such alternatives, modifications and equivalents as may be included within the spirit and scope of the invention as defined by the appended claims.

What is claimed is:

1. A differential gear having an input side rotary member for receiving an external driving force, first and second output side rotary members for respectively driving a left driving wheel and a right driving wheel and arranged coaxially with a rotational axis of the input side rotary member, and a gear body for supporting the input side rotary member and the output side rotary members in a freely rolling manner, with a rotational force of the input side rotary member being transmitted to the output side rotary members while permitting a difference in speed of rotation between the output side rotary members, said differential gear comprising:

a first input side gear disposed on said input side rotary member at one end thereof in an axial direction, said first input side gear jointly rotatable with said input side rotary member;

a second input side gear disposed on said input side rotary member at said one end thereof in the axial direction, said second input side gear jointly rotatable with said input side rotary member;

a first output side gear having a different deceleration ratio relative to said first input side gear, said first output side gear jointly rotatable with one of said output side rotary members;

a second output side gear having a different deceleration ratio relative to said second input side gear, said second output side gear rotatable coaxially with one of said output side rotary members;

at least one first planetary gear meshing with said first input side gear and said first output side gear;

at least one second planetary gear meshing with said second input side gear and said second output side gear;

a support member for supporting said first planetary gear and said second planetary gear to be able to rotate coaxially on their own axes and to revolve around the rotational axis of said input side rotary member;

first rotation controlling means for controlling with an arbitrary controlling force a rotation of said support member around the rotational axis of said input side rotary member to thereby arbitrarily control a rotational difference between the left and the right driving wheels by restricting with the arbitrary controlling force the rotation of the support member; and second rotation controlling means for controlling with an arbitrary controlling force a rotation of said second output side gear to thereby arbitrarily control the rotational difference between the left and the right driving wheels by restricting with the arbitrary controlling force the rotation of the second output side gear.

2. The differential gear according to claim 1, wherein:

said first rotation controlling means include a first plurality of first friction plates rotating jointly with said support member, a first plurality of second friction plates supported by said gear body, and first pressing means for pressing together the first friction plates and the second friction plates with an arbitrary pressing force; and said second rotation controlling means include a second plurality of first friction plates jointly rotatable with said second output side gear, a second plurality of second friction plates supported by said gear body, and second pressing means for pressing together the first friction plates and the second friction plates with an arbitrary pressing force.

3. A differential gear having an input side rotary member for receiving an external driving force from another differential gear, first and second output side rotary members arranged coaxially with a rotational axis of the input side rotary member for respectively driving first and second driving wheels, and a gear body for supporting the input side rotary member and the output side rotary members in a freely rolling manner, with a rotational force of the input side rotary member being transmitted to the output side rotary members while permitting a difference in speed of rotation between the output side rotary members, said differential gear comprising:

a first input side gear disposed on said input side rotary member at one end thereof in an axial direction, said first input side gear jointly rotatable with said input side rotary member;

a second input side gear disposed on said input side rotary member at said one end thereof in the axial direction, said second input side gear jointly rotatable with said input side rotary member;

a first output side gear having a different deceleration ratio relative to said first input side gear, said first output side gear jointly rotatable with one of said output side rotary members;

a second output side gear having a different deceleration ratio relative to said second input side gear, said second output side gear rotatable coaxially with one of said output side rotary members;

at least one first planetary gear meshing with said first input side gear and said first output side gear;

at least one second planetary gear meshing with said second input side gear and said second output side gear;

a support member for supporting said first planetary gear and said second planetary gear to be able to rotate coaxially on their own axes and to revolve around the rotational axis of said input side rotary member;

a first brake positioned between said support member and the gear body of said differential gear for controlling with an arbitrary controlling force a rotation of said support member around the rotational axis of said input side rotary member to thereby arbitrarily control a rotational difference between the first driving wheel and the second driving wheel by restricting with the arbitrary controlling force the rotation of the support member; and a second brake positioned between the second output side gear and the gear body for controlling with an arbitrary controlling force a rotation of said second output side gear to thereby arbitrarily control the rotational difference between the first driving wheel and the second driving wheel by restricting with the arbitrary controlling force the rotation of the second output side gear.

4. The differential gear according to claim 3, wherein:

said first brake includes a first plurality of first friction plates rotating jointly with said support member, a first plurality of second friction plates supported by said gear body, and first pressing means for pressing together the first friction plates and the second friction plates with an arbitrary pressing force; and said second brake includes a second plurality of first friction plates jointly rotatable with said second output side gear, a second plurality of second friction plates supported by said gear body, and second pressing means for pressing together the first friction plates and the second friction plates with an arbitrary pressing force.

* * * * *